United States Patent [19]

Gilhousen et al.

[11] Patent Number: 4,712,238
[45] Date of Patent: Dec. 8, 1987

[54] SELECTIVE-SUBSCRIPTION DESCRAMBLING

[75] Inventors: Klein S. Gilhousen; Jerrold A. Heller; Michael Van Harding, all of San Diego; Robert D. Blakeney, II, Del Mar, all of Calif.

[73] Assignees: M/A-COM Government Systems, Inc.; Cable/Home Communication Corp., both of San Diego, Calif.

[21] Appl. No.: 618,917

[22] Filed: Jun. 8, 1984

[51] Int. Cl.⁴ .................. H04N 7/167; H04N 7/00; H04L 9/00

[52] U.S. Cl. .................. 380/20; 340/825.33; 340/825.34; 358/84; 380/23; 380/29; 380/44; 380/45

[58] Field of Search .............. 358/122, 115, 84; 455/2; 340/825.33, 825.34; 178/22.13; 380/20, 23, 29, 44, 45

[56] References Cited

U.S. PATENT DOCUMENTS

| | | | |
|---|---|---|---|
| 2,573,349 | 10/1951 | Miller et al. | 177/353 |
| 2,788,387 | 4/1957 | Druz | 178/5.1 |
| 2,864,885 | 12/1958 | Morris | 178/5.1 |
| 2,866,962 | 12/1958 | Ellett | 340/147 |
| 3,016,091 | 9/1962 | Kirk, Jr. et al. | 178/5.1 |
| 3,531,586 | 9/1970 | Bass et al. | 178/6 |
| 3,736,369 | 5/1973 | Vogelman et al. | 178/5.1 |
| 3,882,392 | 5/1975 | Harney | 325/53 |
| 3,886,302 | 5/1975 | Kosco | 178/5.1 |
| 3,890,461 | 6/1975 | Vogelman et al. | 178/5.1 |
| 3,934,079 | 1/1976 | Barnhart | 455/2 |
| 3,956,615 | 5/1976 | Anderson et al. | 235/61.7 |
| 3,997,718 | 12/1976 | Ricketts et al. | 178/6.8 |
| 4,068,264 | 1/1978 | Pires | 358/122 |
| 4,115,807 | 9/1978 | Pires | 358/122 |
| 4,130,833 | 12/1978 | Chomet | 358/122 |
| 4,163,254 | 7/1979 | Block et al. | 358/122 |
| 4,163,255 | 7/1979 | Pires | 358/122 |
| 4,225,884 | 9/1980 | Block | 358/122 |
| 4,245,245 | 1/1981 | Matsumoto et al. | 358/122 |
| 4,323,922 | 4/1982 | den Toonder et al. | 358/117 |
| 4,388,643 | 6/1983 | Aminetzah | 358/122 |
| 4,434,436 | 2/1984 | Kleykamp et al. | 358/118 |
| 4,475,123 | 10/1984 | Dumbauld et al. | 358/114 |
| 4,484,027 | 11/1984 | Lee et al. | 358/122 |
| 4,484,217 | 11/1984 | Block et al. | 358/84 |
| 4,486,773 | 12/1984 | Okubo | 358/84 |
| 4,528,589 | 7/1985 | Block et al. | 358/122 |
| 4,531,021 | 7/1985 | Bluestein et al. | 358/122 |
| 4,535,355 | 8/1985 | Arn et al. | 358/123 |
| 4,536,791 | 8/1985 | Campbell et al. | 358/122 |

OTHER PUBLICATIONS

PCT Patent Application WO83/04154; Block, Robert S. and Lull, John M. 05/11/82; "Method and System for Remote Reporting, Particularly for Pay Television Billing".

Primary Examiner—Stephen C. Buczinski
Attorney, Agent, or Firm—Edward W. Callan

[57] ABSTRACT

A system in a subscriber television network for enabling descrambling of a received scrambled signal on a prepaid basis and/or an impulse-purchase basis. A received mask signal uniquely related to the scrambled signal is compared with a received authorization signal indicating whether the subscriber is authorized to receive the scrambled signal on a prepaid basis and a prepaid signal for enabling descrambling is provided when the compared signals match. A not-prepaid signal is provided when they do not match. A received cost signal indicating the charge for descrambling the scrambled signal and a received credit signal indicating only the subscriber's accumulated credit are processed with reference to a stored record of the subscriber's prior accumulated charges to determine whether the subscriber has sufficient available credit to pay for descrambling of the scrambled signal. If a program is not prepaid and if sufficient credit is available, the subscriber is given the option of causing the signal to be descrambled on an impulse-purchase basis. To prevent a subscriber from obtaining descrambling through such deceit as changing the mask, authorization, cost and/or credit signals, these signals are processed with key signals which are used in scrambling and descrambling the television signal such that descrambling is prevented if any of the mask authorization, cost and/or credit signals is changed.

6 Claims, 4 Drawing Figures

SELECTIVE-SUBSCRIPTION DESCRAMBLING

BACKGROUND OF THE INVENTION

The present invention generally pertains to descrambling systems for subscriber communication networks and is particularly directed to systems for enabling descrambling on a selective-subscription basis.

Selective-subscription subscriber communication networks provide for descrambling of signals on a prepaid basis and/or on an impulse-purchase basis.

In one type of prepaid descrambling system, a descrambler at the subscriber terminal is adapted to descramble all communications received over a given communications channel, such as, for example, all of the programs broadcast over a given television channel. When service is discontinued, the descrambler must be modified to prevent descrambling of signals received over the given channel. In another type of prepaid descrambling system, descrambling is enabled by an enable signal addressed to the descrambler at the subscriber terminal.

Typical impulse-purchase subscriber communication network descrambling systems are described in U.S. Pat. Nos. 2,573,349 to Miller et al; 2,788,387 to Druz; 2,864,885 to Morris; 2,866,962 to Ellett; 3,531,586 to Bass et al; 3,736,369 to Vogelman et al; 3,916,091 to Kirk, Jr. et al; and 4,130,833 to Chomet.

Bass et al describes an impulse-purchase system for a subscriber television network in which a debit (cost) signal related to the viewing cost of a given television program is transmitted to each subscriber terminal and processed in relation to an indication of the subscriber's established credit to determine whether the subscriber is authorized to view the given program. In the Bass et al system subscriber credit is established in response to the insertion of coins into a coin mechanism included in the subscriber terminal. If after a subscriber has accepted a given program for viewing the program is cancelled, such as for technical reasons, a credit signal is transmitted to the subscriber terminals to restore the subscriber's established credit by an appropriate amount.

Druz describes an impulse-purchase system for a subscriber television network in which a cost signal containing charging information related to the cost of viewing a given program is transmitted to the subscribers and upon acceptance by a subscriber of the program for viewing, the charging information is recorded by a recording device at the subscriber terminal. The recorded charging information is collected or read from the recording device periodically and the subscriber subsequently is billed for the total cost of programs selected for viewing during the previous period.

Both of these prior art systems require some type of post-viewing collection from the subscriber. With the Bass et al system coins must be collected from each individual subscriber's coin mechanism; and with the Druz system the recorded charging information must be collected from each individual subscriber's recording device.

One object of the present invention is to provide an impulse-purchase descrambling system which enables other payment methods in addition, or alternative, to such post-viewing collection from each individual subscriber terminal.

Another object of the present invention is to provide an impulse-purchase descrambling system that will enable special event television programs transmitted on a given pay-TV channel to be selected for viewing on an impulse-purchase basis by subscribers who do not regularly subscribe to all of the programming on such channel.

Still another object of the present invention is to provide a descrambling system that can be controlled by received signals to either descramble scrambled signals on a prepaid basis or to offer descrambling on an impulse-purchase basis depending upon the subscription status of the subscriber and whether the signal is authorized for descrambling on an impulse-purchase basis.

A further object of the present invention is to provide a system for preventing a subscriber from being able to enable descrambling in a selective-subscription subscriber communication network through such deceit as substituting other signals for transmitted signals, such as a cost signal, that are received and processed at the subscriber terminal to enable descrambling.

SUMMARY OF THE INVENTION

The present invention provides improved systems for enabling descrambling of a received scrambled signal on an impulse-purchase basis in a subscriber terminal of a subscriber communication network. One improved system includes a circuit for processing a received cost signal indicating the charge for descrambling the scrambled signal and a received credit signal indicating only the accumulated credit attributed to the subscriber to determine whether the subscriber has sufficient available credit to pay for descrambling of the scrambled signal, and for providing a credit-available signal when it is determined that there is sufficient credit available; a device that is responsive to the credit-available signal for indicating that the subscriber has the option of causing the scrambled signal to be descrambled on an impulse-purchase basis; a device which is enabled in response to the credit-available signal, for accepting said option and for providing an accepted signal upon acceptance; and a circuit that is responsive to the accepted signal for enabling the scrambled signal to be descrambled.

The credit signal may indicate accumulated payments made by the subscriber and/or credit extended to the subscriber in advance of the signal being descrambled on an impulse-purchase basis. This system does not require postuse collection of money or charge information from each individual subscriber terminal as with the prior art systems described hereinabove.

In a separate aspect, the present invention provides a system for descrambling scrambled signals on a prepaid basis. This system includes a circuit for comparing a received mask signal related to the scrambled signal with a received authorization signal addressed to the subscriber terminal and indicating whether the subscriber is authorized to descramble the scrambled signal on a prepaid basis and for providing a prepaid signal when the compared signals match to a prescribed degree; and a circuit that is responsive to the prepaid signal for enabling the scrambled signal to be descrambled. This prepaid descrambling system is compatible with the impulse-purchase descrambling system of the present invention such that both can be combined in a single system.

Such a combined system includes a circuit for comparing a received mask signal indicating the accumulated credit attributed to the subscriber with a received authorization signal indicating whether the subscriber is authorized to descramble the scrambled signal on a prepared basis, and for providing a prepaid signal when the compared signals match to a prescribed degree and a not-prepaid signal when they do not match. This combined system further includes a circuit for processing a received cost signal indicating the charge for descrambling the scrambled signal and a credit signal related to the subscriber's available credit to determine whether the subscriber has sufficient available credit to pay for descrambling of the scrambled signal, and for providing a credit-available signal when it is determined that there is sufficient credit available; a device that is responsive to both the not-prepaid signal and the creditavailable signal for indicating that the subscriber has the option of causing the signal to be descrambled on an impulse-purchase basis; a device which is enabled in response to both the not-prepaid signal and the credit available signal for the subscriber to operate to accept such option, and for providing an accepted signal upon acceptance; and a circuit that is responsive to the accepted signal for enabling the scrambled signal to be descrambled.

This system is particularly useful for enabling special event television programs transmitted on a given pay-TV channel to be selected for viewing on an impulse-purchase basis by subscribers who do not regularly subscribe to all of the programming on such channel. For such an application the authorization signal addressed to a given subscriber who regularly subscribes to all of the programming on the given pay-TV channel matches the mask signal to the prescribed degree. Since the regular subscriber receives all of the programs on the given channel there is no need for the impulse-purchase option to be made available for such subscriber. To provide a service wherein only certain special event programs are made available to the nonregular subscribers on an impulse-purchase basis, an impulse-purchase signal is included in th mask signal that is uniquely related to scrambled special event programs, and the option of causing the scrambled signal to be descrambled is indicated to the subscriber and the acceptance device is enabled only when an impulse-purchase signal related to the scrambled signal is included in the mask signal that is received by the subscriber terminal.

Preferably, prepaid status is indicated by providing a "TRUE" bit in a given bit position of the authorization signal. Other bit positions may be used for other authorization functions. Since the bit-length of the authorization signal may be less than the number of authorization functions and programs and/or channels for which prepaid service may be indicated, each subscriber terminal includes a memory for storing a plurality of the authorization signals and for providing a selected one of the stored authorization signals for comparison with the mask signal in response to an address signal received with the mask signal.

Still another improved system prevents a subscriber from being able to enable descrambling through such deceit as substituting other signals for transmitted signals, such as cost and credit signals, that are received and processed at the subscriber terminal to enable descrambling. This system is particularly useful in a subscriber communication network in which selective remote descrambling of the scrambled signal is controlled through the use of key signals, including encrypted key signals that are transmitted to the subscriber terminal and that must be decrypted in the subscriber terminal to enable the scrambled signal to be descrambled. This prevention system includes a circuit for encoding one or more of the key signals prior to encrypting a said key signal and/or prior to using a said key signal to encrypt another said key signal by processing said one or more said key signals with the cost signal, and the credit signal and/or the mask signal and the authorization signal prior to the transmission of the encrypted key signals; and a circuit in each subscriber terminal for decoding the one or more of the key signals following decryption thereof, and/or prior to use thereof for keying decryption of a said encrypted key signal by processing said key signals with the respective cost signal and credit signal and/or mask signal and authorization signal used to encode the one or more of the key signals. Changing any of the credit signal, cost signal, mask signal or authorization signal prevents decryption of the key signals and thereby prevents descrambling.

In another aspect, the present invention provides a system in a subscriber communication network for verifying charge information furnished to a broadcast company by a given subscriber and purported by the subscriber as having been displayed at the subscriber terminal. At the subscriber terminal there is generated a debit signal indicating the charges attributed to the subscriber terminal; and in response to the debit signal, a display of information indicating the accumulated charges is provided to the subscriber. An authentication signal is provided at the subscriber terminal by processing the debit signal in accordance with an encryption algorithm upon the algorithm being keyed by a key signal that is unique to the subscriber terminal; and in response to the authentication signal, a display of information representative of the authentication signal is provided to the subscriber. The subscriber copies the displayed information and sends it to the broadcast company with his periodic bill payment. At the broadcast company the information furnished by the given subscriber that purportedly is the displayed charges information and the authentication information is entered in a processing system and converted into a received debit signal and a received authentication signal respectively. The received debit signal is processed with the received authentication signal to determine whether the information furnished by the given subscriber was authentic.

Additional features of the present invention are described in relation to the description of the preferred embodiment.

DESCRIPTION OF THE PREFERRED EMBODIMENT

Figure 1:
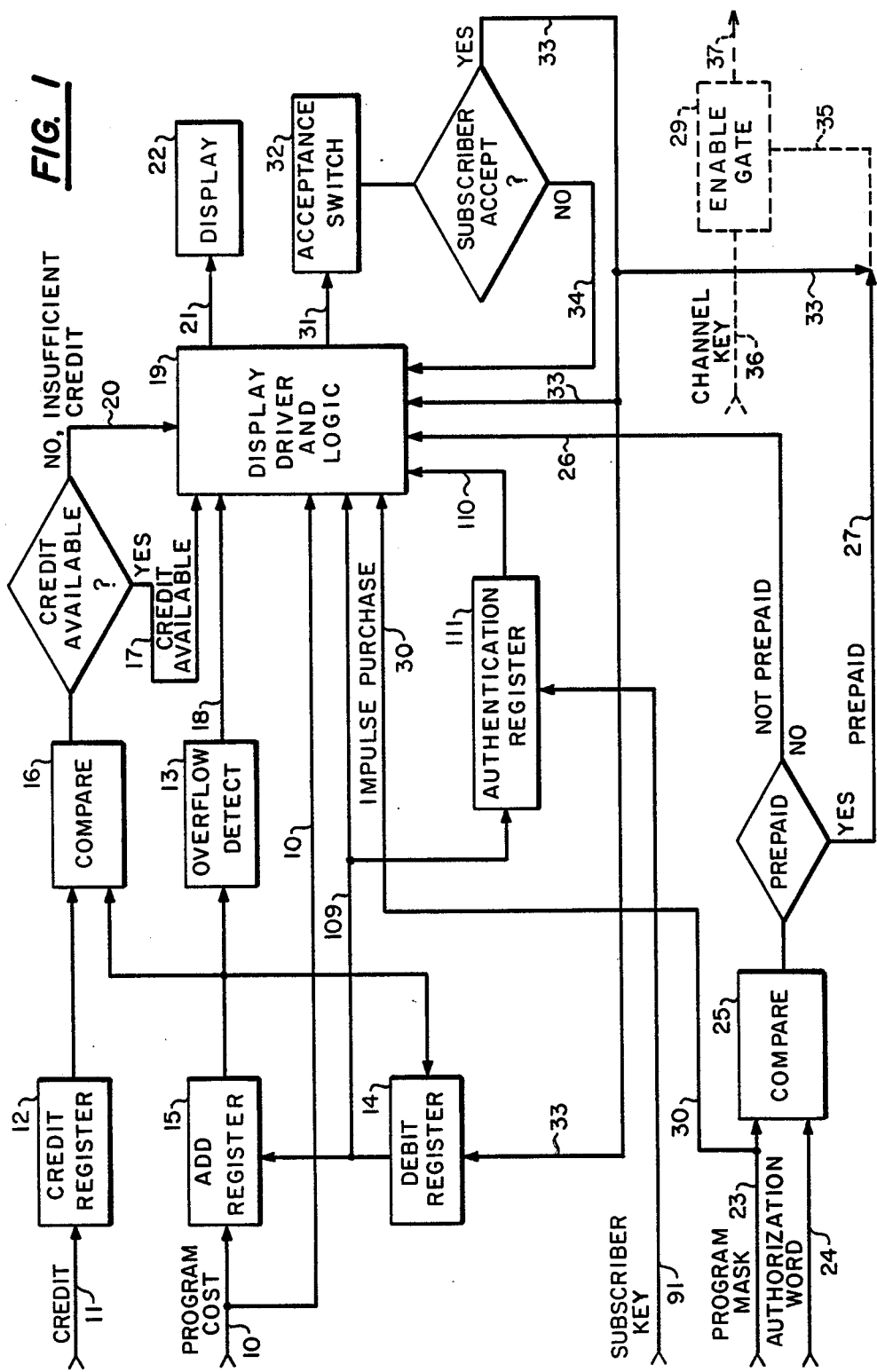
FIG. 1 is a combination functional and flow block diagram of an authorization processor embodying the systems of the present invention.

The preferred embodiment of the present invention is included in an authorization processor which is described with reference to FIG. 1. The authorization processor is included in a subscriber terminal in a subscriber television network, such as is described in co-pending U.S. patent application Ser. No. 498,800 filed May 2, 1983 by Klein S. Gilhousen and Charles F. Newby for "KEY SIGNAL ENCRYPTION AND DISTRIBUTION SYSTEM FOR CONTROLLING SCRAMBLING AND SELECTIVE REMOTE DESCRAMBLING OF TELEVISION SIGNALS." The authorization processor of FIG. 1 enables descrambling of a received scrambled television signal on an impulse-purchase or a prepaid basis.

The authorization processor receives a program cost signal on line 10 and a credit signal on line 11. The cost signal indicates the charge for descrambling a given received scrambled television signal, and is provided to all of the subscriber terminals in the subscriber television network. Credit signals are unique to each subscriber and they are individually addressed to the respective subscriber terminals in the network. Each credit signal indicates the accumulated credit attributed to the respective individual subscriber.

The authorization processor includes a credit register 12, an overflow detection device 13, a debit register 14, an add register 15 and a comparison unit 16. The credit register 12 registers the credit signal received on line 11. The debit register 14 registers the accumulated charges for scrambled signals accepted by the respective individual subscriber for descrambling. The add register 15 adds and registers the sum of the charge indicated by the program cost signal on line 10 and the accumulated charges registered in the debit register 14. The comparison unit 16 compares the credit signal registered in the credit register 12 with the sum of the addition registered in the add register 15 to determine whether the subscriber has sufficient credit available to pay for descrambling of the scrambled signal. If upon such comparison it is determined that the accumulated credit indicated by the credit signal registered in the credit register 12 is not less than the sum of the addition registered in the add register 15, a credit-available signal is provided on line 17 to a display driver and logic circuit 19. If upon such comparison it is determined that such accumulated credit is less than such sum, an insufficient credit signal is provided on line 20 to the display driver and logic circuit 19.

The display driver and logic circuit 19 provides signals on line 21 for controlling the content of a display on a video monitor display device 22, such as the television set that is attached to the subscriber terminal. Alternatively, the display device 22 can be an alphanumeric display on the front panel of the descrambler unit.

The authorization processor also receives a program mask signal on lines 23 and an authorization word signal on lines 24. The program mask signal is a 56-bit digital signal that is unique to each scrambled program that is broadcast over the subscriber television network. The program mask signal is provided to all of the subscriber terminals in the network. The authorization word signal is a 56-bit word signal that is individually addressed to the respective individual subscriber terminals in the network. If the respective subscriber regularly receives all of the scrambled programs on the given TV channel, the authorization word signal addressed to the respective subscriber terminal will match the program mask signal that is provided to all of the subscriber terminals in the network to the prescribed degree. If the respective subscriber is not a regular subscriber to all of the scrambled programs on the given channel, the authorization word addressed to the respective subscriber terminal and received on lines 24 does not match the program mask signal that is received on lines 23.

The authorization processor includes a second comparison unit 25, which compares the received program mask signal on lines 23 with the received authorization word signal on lines 24. When the compared signals do not match to the prescribed degree, a not-prepaid signal is provided on line 26 to the display driver and logic circuit 19. When the compared signals do match, a prepaid signal is provided on line 27 to an enable gate 29.

The comparison unit 25 logically AND's the corresponding bits from the program mask signal on line 23 with the authorization word signal on line 24 and then logically OR's the results of the logical AND operation. A match in any one of the corresponding pairs of bits results in the prepaid signal being provided on line 27. Typically the different bit positions in the authorization word signal correspond to different TV channels and/or programs. Thus an authorization word signal for a given descrambler includes a "TRUE" bit in the bit position designated for each program and/or channel for which service has been prepaid. The program mask signal includes a TRUE bit in each position corresponding to a given program and/or channel.

One of the bits of the program mask signal on line 23 indicates whether the received scrambled television signal may be descrambled on an impulse-purchase basis. When it may be so descrambled, an impulse-purchase signal is provided in this bit position and is provided on line 30 to the display driver and logic circuit 19.

Certain bits of the program mask signal and the authorization word signal may provide additional authorization functions, such as stereo audio enable, remote control enable and alternate language selection.

The display driver and logic 19 circuit contains logic circuitry which dictates the content of the signals that are provided on line 21 to the display device 22. When a credit-available signal is provided on line 17, a not-prepaid signal is provided on line 26 and an impulse-purchase signal is provided on 30, the display driver and logic circuit 19, provides an enabling signal on line 31 to an acceptance switch 32 and further provides a signal on line 21 that results in the display device 22 displaying an indication to the subscriber that the subscriber has the option of causing the scrambled television signal to be displayed on an impulse-purchase basis.

The subscriber may indicate acceptance of the option by operating the switch 32 only when the switch 32 is enabled by the enabling signal on line 31. If the subscriber so accepts the option, an accepted signal is provided on line 33 to the enable gate 29. The accepted signal on line 33 also is provided to the display driver and logic circuit 19, which responds thereto by causing the display device 22 to briefly indicate acknowledgement of the subscriber's acceptance. Thereafter, the descrambled television signal is displayed on the given TV channel. If the subscriber indicates by operation of the switch 32 that the option is not accepted, a signal is provided on line 34 to the display driver and logic circuit 19, which responds thereto by causing the display device 22 to briefly indicate acknowledgement of the subscriber's non-acceptance. Thereafter, only a blank screen signal is displayed on the given TV channel. The display driver and logic circuit 19 responds to the insufficient credit signal on line 20 by causing the display device 22 to briefly indicate that the subscriber's credit is insufficient to enable descrambling of the scrambled signal. Alternatively the display may provide a continuous indication that the program is not authorized because either it is not prepaid or because sufficient credit is not available.

The accepted signal on line 33 is further provided to the enter enable input of the debit register 14 and causes the sum registered in the add register 15 to be entered into the debit register 14, thereby effectively incrementing the accumulated charges in the debit register 14 by the charge indicated by the program cost signal received on line 10.

The overflow detection device 13 is coupled to the add register 15 for detecting when the arithmetic limit of the debit register 14 would be exceeded by incrementing the accumulated charges in the debit register 14 by the charge indicated by the program cost signal on line 10 and for providing an overflow signal on line 18 upon said detection. The display driver and logic circuit 19 responds to the overflow signal on line 18 by preventing an enabling signal from otherwise being provided on line 31 in response to a credit-available signal on line 17. This feature is provided in order to prevent a subscriber from feeding false cost and credit signals into the authentication processor in order to increment the debit register 14 until it overflows to thereby store an amount less than the actual accumulated charges attributed to the subscriber terminal.

Whenever either the prepaid signal is provided on line 27 or the accepted signal is provided on line 33 to the enable gate input line 35, the enable gate 29 provides a decrypted and decoded channel key signal from line 36 onto line 37 and thereby enables the scrambled television signal to be descrambled. The significance of passing this key signal onto line 37 is explained somewhat later below with reference to FIGS. 2 and 3.

Figure 2:
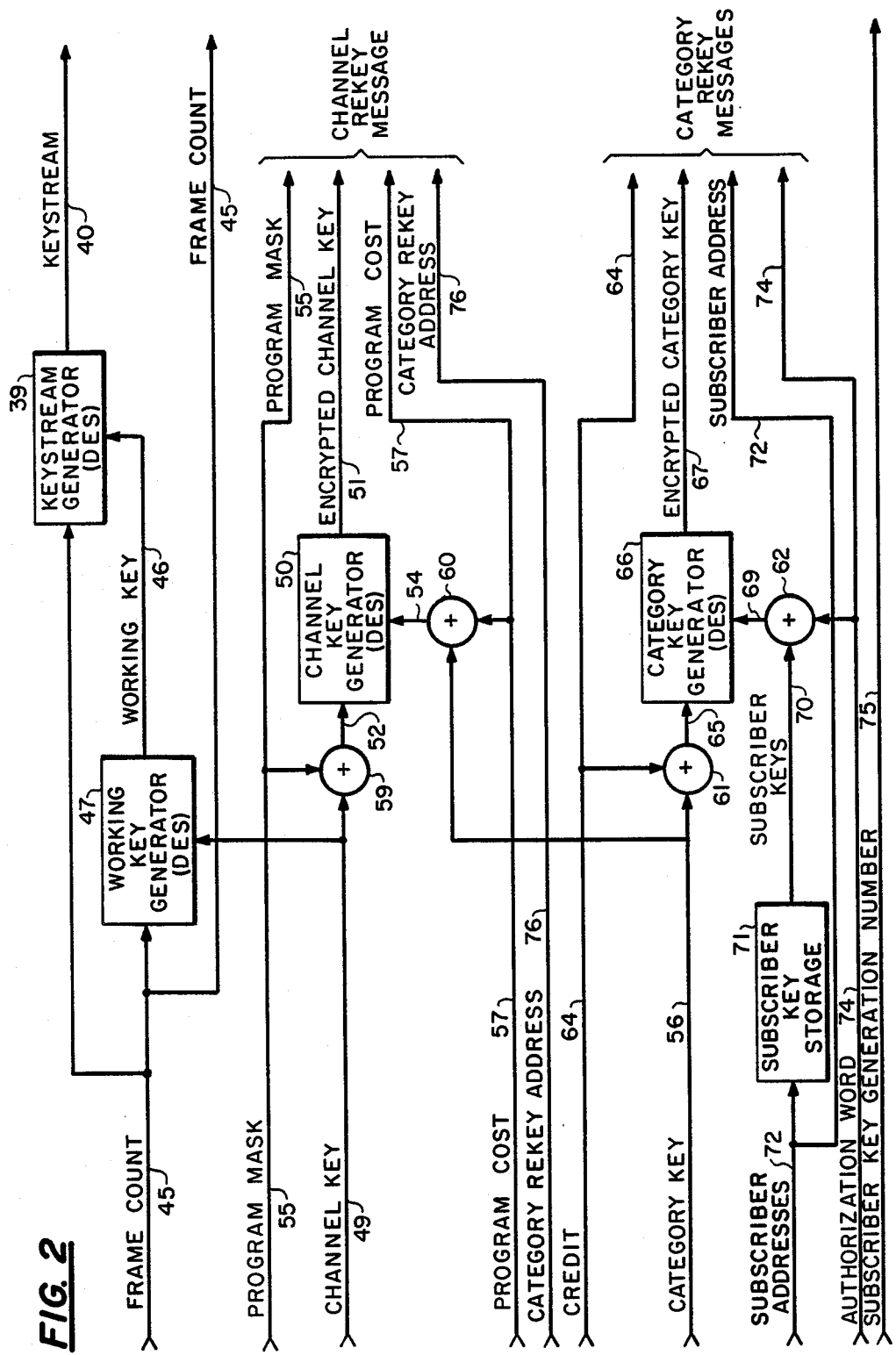
FIG. 2 is a functional block diagram of a key signal encryption system included in broadcast terminal of a subscriber communication network including the system of the present invention.
Figure 3:
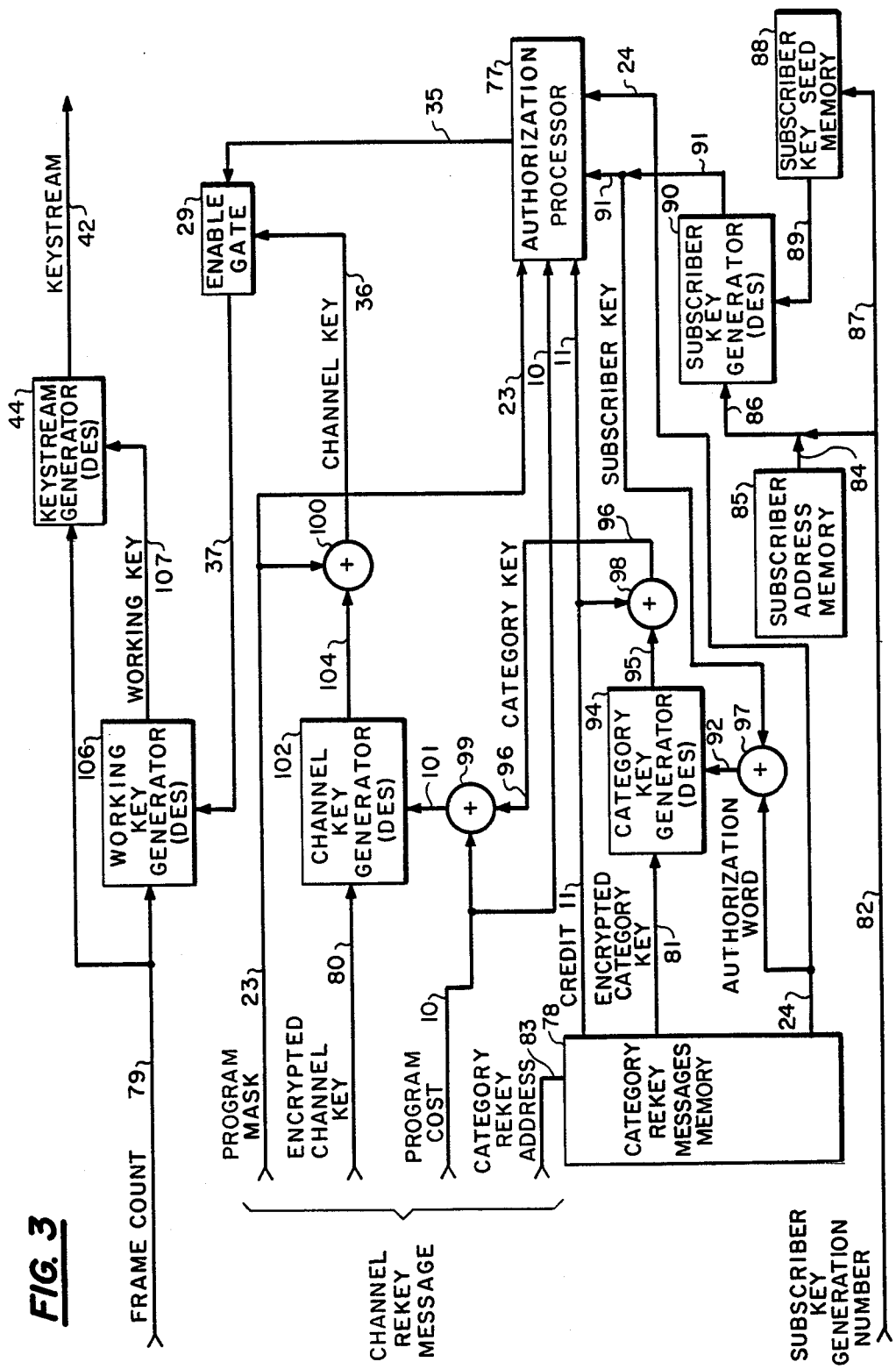
FIG. 3 is a functional block diagram of a key signal decryption system included in a subscriber terminal that includes the authorization processor of FIG. 1.

FIG. 2 and 3 respectively show the encryption and decryption systems included in the broadcast terminal and each subscriber terminal of a subscriber television network with which the systems of the present invention are particularly useful. The encryption and decryption systems of FIGS. 2 and 3 are especially adapted to prevent a subscriber from being able to enable descrambling of the scrambled signal through deceit by substituting other signals for one or more of the respective transmitted program mask signal, authorization word signal, program cost signal and credit signal received by the subscriber terminal in order to obtain a match upon said comparison and/or to cause a credit-available signal to be provided when in fact the subscriber's credit is inadequate.

Referring to the encryption system of the broadcast terminal (FIG. 2) a keystream generator 39 produces a keystream signal on line 40 that is used to scramble the television signal. An identical keystream signal must be reproduced on line 42 by the keystream generator 44 in the decryption system of the subscriber terminal (FIG. 3) in order for the descrambler in the subscriber terminal to be able to descramble the scrambled television signal.

Referring again to FIG. 2, the keystream generator 39 of the encryption system generates the keystream signal on line 40 by processing an initialization vector (IV) frame count signal on line 45 in accordance with the Data Encryption Standard (DES) algorithm upon the algorithm being keyed by a working key signal on line 46.

A working key generator 47 generates the working key signal on line 46 by processing the frame count signal on line 45 in accordance with the DES algorithm upon the algorithm being keyed by a channel key signal on line 49. The channel key signal on line 49 is provided by a control computer (not shown) at the broadcast terminal.

The channel key signal on line 49 is encrypted for transmission to the subscriber terminals. A channel key generator 50 encrypts the channel key signal by generating an encrypted channel key signal on line 51 by processing an encoded channel key signal on line 52 in accordance with the DES algorithm upon the algorithm being keyed by an encoded category key signal on line 54.

Incident to the scheme for preventing descrambling by deceit through substitution of one or more of the program mask signal, the authorization word signal, the program cost signal and the credit signal, the program mask signal on line 55 is used to encode the channel key signal on line 49 by exclusive- OR'ing the channel key signal on line 49 with the program mask signal on line 55 to provide the encoded channel key signal on line 52. Incident to the same scheme the encoded category key signal on line 54 is produced by exclusive-OR'ing a category key signal provided on line 56 by the control computer with a program cost signal provided on line 57 by the control computer. The program cost signal on line 57 also is provided by the control computer.

The symbols 59, 60, 61 and 62 in FIG. 2 represent exclusive-OR logic elements.

The category key signal on line 56 also is encrypted for transmission to the subscriber terminals. Prior to such encryption the category key signal on line 56 is encoded by being exclusive-OR'd with a credit signal provided on line 64 by the control computer to thereby provide an encoded category key signal on line 65. This is incident to the aforementioned prevention scheme.

The position of the bits of the category key signal on line 56 that are exclusive-OR'd with the credit signal on line 64 must be different from the position of the bits of the category key signal on line 56 that are exclusive-OR'd with the program cost signal on line 57. The derivation of the credit signal is described below with reference to FIG. 4.

A category key generator 66 encrypts the category key signal by generating a plurality of unique encrypted category key signals on line 67 by processing the encoded category key signal on line 65 in accordance with the DES algorithm upon the algorithm being keyed by a corresponding plurality of encoded unique subscriber key signals on line 69. The subscriber key signals are unique to the individual subscriber terminals.

A plurality of unique subscriber key signals are provided on line 70 from a subscriber key storage memory 71 upon the memory 71 being accessed by a plurality of respective subscriber addresses provided on line 72 by the control computer. The subscriber key signals on line 70 are exclusive-OR'd with an authorization word signal provided on line 74 by the control computer to provide the encoded subscriber key signals on line 69.

The authorization word signal on line 74 that is used for encoding the subscriber key signal on line 70 either matches or doesn't match the program mask signal on line 55 in accordance with whether the subscriber terminal corresponding to the individual subscriber key signal being decoded is assigned to a subscriber who is a regular subscriber to all of the programs on the given TV channel. The use of the authorization word signals on line 77 also is incident to the aforementioned prevention scheme.

The control computer also provides a subscriber key generation number on line 75 that is unique to the broadcaster.

The combination of the credit signal on line 64, the encrypted category key signal on line 67, the subscriber address on line 72, and the authorization word signal on line 74 that all pertain to a given subscriber terminal are transmitted together as a category rekey message that is addressed to the given subscriber terminal by the subscriber address included in such message. Accordingly, unique category rekey messages are transmitted to each of the subscriber terminals.

When the number of alternative authorization functions and the number of alternative programs and/or channels that are provided to the subscribers over the network exceeds the 56 bit positions of the authorization word signals are provided and included in separate respective category rekey message addressed to each given subscriber terminal, where they are stored upon receipt.

The program mask signal on line 55, the encrypted channel key signal on line 51 and the program cost signal on line 57 pertain to all of the subscriber terminals and are transmitted together as a channel rekey message to all of the subscriber terminals. The channel rekey message also contains a category rekey address signal on line 76 for selecting one of the stored category rekey messages from storage in the subscriber terminal in accordance with which programs and/or channels and authorization functions are indicated by TRUE bits in the respective bit positions of the program mask signal on line 55. The frame count signal on line 45 and the subscriber key generation number on line 75 also are transmitted to all of the subscriber terminals.

The encryption system of FIG. 2, the manner in which the frame count signal, the channel rekey message, the category rekey messages and the subscriber key generation number are further processed prior to transmission; and the use of the keystream signal for scrambling the television signal are described in greater detail in the aforementioned U.S. patent application Ser. No. 498,800, the essential disclosure of which is incorporated herein by reference.

The decryption system of each subscriber terminal, as shown in FIG. 3, includes an authorization processor 77, a rekey message memory 78 and the enable gate 29. The authorization processor 77 is as described above with reference to FIG. 1. The rekey message memory 78 stores all of the different rekey messages addressed to the given subscriber terminal.

The decryption system of each subscriber terminal receives the frame count signal on line 79, the program mask signal on line 23, the encrypted channel key signal on line 80, the program cost signal on line 10, the credit signal on line 11, the encrypted category key signal on line 81, the authorization word signal on line 24, and the subscriber key generation number on line 82, and the category rekey address signal on line 83. The credit signal on line 11, the encrypted category key signal on line 81 and the authorization word signal on line 24 are retrieved from the storage location of the memory 78 that is accessed by the address signal on line 83.

The received subscriber key generation number on line 82 is combined with the subscriber address on line 84 from a subscriber address memory 85 to provide a subscriber key generation signal on line 86.

Two bits in a given position of the received subscriber key generation number on line 82 are also provided on line 87 to access a given address in a subscriber key seed memory 88. The memory 88 stores four subscriber key seed signals that are unique to the subscriber and provides a prescribed key seed signal on line 89 in accordance with the address on line 87.

A subscriber key generator 90 reproduces the subscriber key signal on line 91 corresponding to the subscriber key signal on line 70 in the system of FIG. 2 that was used in encrypting the encrypted category key signal included in the category rekey message addressed to the given subscriber and received on line 81.

The subscriber key generator 90 generates the subscriber key signal on line 91 by processing the subscriber key generation signal on line 86 in accordance with the DES algorithm upon the algorithm being keyed by the prescribed key seed signal on line 89.

The above-described system for reproducing subscriber key signals through use of stored key seed signals is the subject of a U.S. patent application entitled "Descrambler Subscriber Key Production Utilizing Key Seeds Stored In Descrambler" filed on Mar. 15, 1984 by Karl E. Moerder, Ser. No. 589,741 the essential disclosure of which is incorporated herein by reference thereto.

The subscriber key signal on line 91 is exclusive-OR'd with the received authorization word signal received on line 24 to provide an encoded subscriber key signal on line 92 corresponding to the subscriber key signal for the given subscriber on line 69 in the system of FIG. 2.

A category key generator 94 decrypts the encrypted category key signal on line 80 by generating an encoded category key signal on line 95 corresponding to the signal on line 65 in the system of FIG. 2 by processing the encrypted category key signal on line 81 in accordance with the DES algorithm upon the algorithm being keyed by the subscriber key signal on line 92.

The encoded category key signal on line 95 is exclusive-OR'd with the received credit signal on line 11 to provide a decoded category key signal on line 96 corresponding to the category key signal on line 56 in the system of FIG. 2.

The symbols 97, 98, 99 and 100 in FIG. 3 represent exclusive-OR logic elements.

The decoded category key signal on line 96 is exclusive-OR'd with the received program cost signal on line 10 to provide an encoded category key signal on line 101 corresponding to the encoded category key signal on line 54 in the system of FIG. 2.

A channel key generator 102 decrypts the encrypted channel key signal received on line 80 by generating an encoded channel key signal on line 104 corresponding to the signal on line 52 in the system of FIG. 2 by processing the encrypted channel key signal on line 80 in accordance with the DES algorithm upon the algorithm being keyed by the encoded category key signal on line 101.

The encoded channel key signal on line 104 is exclusive-OR'd with the program mask signal on line 23 to provide a decoded channel key signal on line 36 corresponding to the channel key signal on line 49 in the system of FIG. 2.

The enable gate 29 passes the channel key signal from line 36 onto line 37 only when the input line 35 of the enable gate 29 receives either a prepaid signal or an accepted signal from the authorization processor 77, which is described above with reference to FIG. 1.

A working key generator 106 generates a working key signal on line 107 corresponding to the working key signal on line 46 in the system of FIG. 2 by processing the frame count signal received on line 79 in accordance with the DES algorithm upon the algorithm being keyed by the channel key signal on line 37.

The keystream generator 44 generates a keystream signal on line 42 corresponding to the keystream signal on line 40 in the system of FIG. 2 by processing the frame count signal on line 79 in accordance with the DES algorithm upon the algorithm being keyed by the working key signal on line 107.

The subscriber key seed memory 88 and the debit register 14 of each subscriber terminal are included in a non-volatile random access memory (RAM) of an integrated circuit chip that has an architecture which prevents the debit register from being accessed from off the chip. The chip must be capable of performing the computation, comparison and authorization functions of the authorization processor 77 described with reference to FIG. 1 and the decryption and decoding functions of the key signal decryption systems of FIG. 3. A model TMS70C40 chip manufactured by Texas Instruments is preferred. This chip is modified for use in the system of the present invention by disabling the capability for accepting instructions from off the chip, thereby preventing an instruction to read the secure memory from being accepted.

A more detailed description of the decryption system of FIG. 3 and the use of the keystream for descrambling the received scrambled television signal is set forth in the above-referenced U.S. patent application Ser. No. 498,800, the essential disclosure of which is incorporated herein by reference.

Referring again to FIG. 1, a debit signal on line 109 indicating the contents of the debit register is provided to the display driver and logic circuit 19, which upon operator command provides a signal on line 21 to the display 22 for enabling a display of an indication of the accumulated charges attributed to the subscriber terminal. This enables the subscriber to record the accumulated charges information that is displayed and to transmit the same to the broadcast company whenever called for, such as when service is discontinued, when the subscriber terminal equipment is transferred to another subscriber or upon payment of the subscriber's periodic billing. This accumulated charges information is used by the broadcaster to resolve any billing disputes that may arise with the subscriber or to facilitate computation of a refund when service is discontinued or the equipment is transferred.

In order to verify the accumulated charge information provided to the broadcast company by the subscriber, authentication information also is displayed on the display 22 for copying the transmittal to the broadcast company by the subscriber. The authentication information is displayed in response to an authentication signal provided on line 110 to the display driven and logic circuit 19 by an authentication generator 111. The authentication generator 111 generates the authentication signal on line 110 by processing the debit signal on line 109 in accordance with the DES algorithm upon the algorithm being keyed by the subscriber key signal on line 91.

In a subscriber television network having a two-way communication link between the broadcast terminal and the subscriber terminal the debit signal on line 109 and/or the authentication signal on line 110 could be stored in a memory (not shown) in the subscriber terminal and accessed from such memory upon command for transmission to the broadcast terminal.

Referring again to the system in which the subscriber records and transmits the displayed accumulated charges information and the authentication information, upon receipt of what is purported by the subscriber to be the displayed accumulated charge information and the authentication information, the broadcast company enters the same into the control computer. The control computer converts the entered information into debit and authentication signals having the same format as the signals provided to the display driver and logic circuit 19 on lines 109 and 110 respectively.

Figure 4:
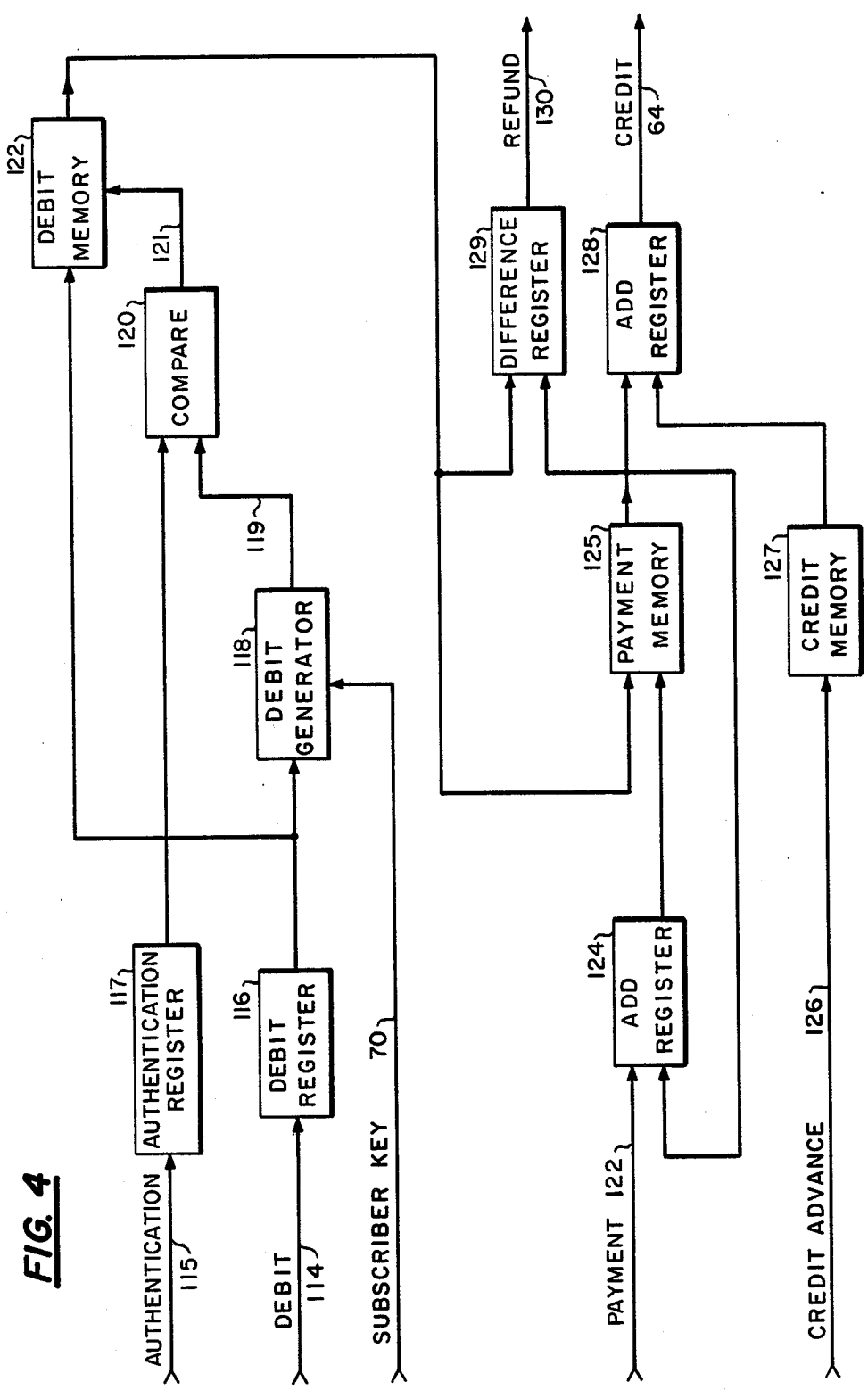
FIG. 4 is a functional block diagram of an information processor which provides the credit signals that are transmitted to the respective subscriber terminals in the system of the present invention.

Referring to FIG. 4, the converted debit and authentication signals in the control computer are provided on lines 114 and 115 respectively. The debit signal is entered in a debit register 116 and the authentication signal is entered in an authentication register 117. The debit signal from the debit register 116 is processed by a debit generator 118 in accordance with the DES algorithm upon the algorithm being keyed by the subscriber key signal on line 70 that is related to the subscriber terminal belonging to the subscriber who transmitted the authentication information. The debit generator 118 thereby generates an authenticating debit signal on line 119 which is compared by a comparison unit 120 with the authentication signal registered in the authentication register 117. If this comparison results in a match, the information provided by the subscriber is verified, and a signal is provided on line 121 to enable entry of the contents of the debit register 116 into a debit memory 122.

FIG. 4 further illustrates how a credit signal for a given subscriber is provided on line 64 (FIG. 2) for transmission to the subscriber terminal.

An indication of the amount of each payment made by a given subscriber is entered into the control computer to provide a payment signal on line 122 to an add register 124. The add register 124 adds and registers the sum of the amount indicated by the payment signal on line 124 and an amount stored in a payment memory 125, which is incremented by the amount of each payment. When service begins for the subscriber, the amount initially stored in the payment memory 125 is the amount then stored in the debit memory 122 for the corresponding subscriber terminal. Upon the amount of each new payment being entered into the control computer the sum registered in the add register 124 is stored in the payment memory 125 to thereby increment the stored payment record by the amount of the new payment.

A signal indicating the amount of any credit extended to the given subscriber is provided on line 126 and stored in a credit memory 127. An add register 128 sums and registers the amount of the credit advance from the credit memory 124 and the amount stored in the payment memory 125 to provide the credit signal on line 64 indicating the accumulated credit attributed to the given subscriber.

When service to the given subscriber is terminated, the amount of any refund due the subscriber is determined by a difference register 129, which registers and provides on line 130 a signal indicating the difference in the amounts stored in the payment memory 125 and the debit memory 122.

What is claimed is:

1. In a subscriber communication network a system for verifying charge information furnished to a broadcast company by a given subscriber and purported by the subscriber as having been displayed at the subscriber terminal, comprising means at the subscriber terminal for providing a debit signal indicating the charges attributed to the subscriber terminal;

means at the subscriber terminal for processing the debit signal to provide an authentication signal;

means at the subscriber terminal responsive to the debit signal for providing to the given subscriber a display of information indicating the charges; and means at the subscriber terminal responsive to the authentication signal for providing to the given subscriber a display of information representative of the authentication signal; and means at the broadcast company for entering information furnished by the given subscriber that purportedly is the displayed charges information and the authentication information and for converting the same into a received debit signal and a received authentication signal respectively; and means for processing the received debit signal with the received authentication signal to determine whether the information furnished by the given subscriber was authentic.

2. A system according to claim 1, wherein the means for processing the debit signal to provide the authentication signal comprises means for providing a key signal that is unique to the given subscriber terminal; and means for generating the authentication signal by processing the debit signal in accordance with an encryption algorithm upon the algorithm being keyed by the key signal.

3. In a subscriber communication network, a system for enabling descrambling of a scrambled signal on an impulse-purchase basis, comprising means for transmitting to the subscribers a cost signal indicating only the charge for descrambling the scrambled signal;

means for transmitting to individually addressed subscribers credit signals respectively indicating credit attributed to the individual subscribers; and a system in each subscriber terminal of the network for enabling descrambling of the scrambled signal received by the subscriber terminal on an impulse-purchase basis, said enabling system comprising means for receiving the cost signal and the credit signal;

means for processing the received cost signal and the received credit signal to determine whether the subscriber has sufficient available credit to pay for descrambling of said scrambled signal, and for providing a credit-available signal when it is determined that there is sufficient credit available;

means responsive to the credit-available signal for indicating that the subscriber has the option of causing the scrambled signal to be descrambled on an impulse-purchase basis;

means enabled in response to the credit available signal, for accepting said option, and for providing an accepted signal upon said acceptance; and means responsive to the accepted signal for enabling the scrambled signal to be descrambled; and a system for verifying charge information furnished to a broadcast company by a given subscriber and purported by the subscriber as having been displayed at the subscriber terminal, said verifying system comprising means at the subscriber terminal for providing a debit signal indicating the accumulated charges attributed to the subscriber terminal;

means at the subscriber terminal for processing the debit signal to provide an authentication signal;

means at the subscriber terminal responsive to the debit signal for providing the given subscriber a display of information indicating the accumulated charges;

means at the subscriber terminal responsive to the authentication signal for providing to the given subscriber a display of information representative of the authentication signal; and means at a broadcast company for entering information furnished by the given subscriber that purportedly is the displayed accumulated charges information andthe authentication information and for converting the same into a received debit signal and received authentication signal respectively; and means for processing the received debit signal with the received authentication signal to determine whether the information furnished by the given subscriber was authentic.

4. A system according to claim 3, wherein the means for processing the debit signal to provide the authentication. signal comprises means for providing a key signal that is unique to the given subscriber terminal; and means for generating the authentication signal by processing the debit signal in accordance with an encryption algorithm upon the algorithm being keyed by the key signal.

5. In a subscriber communication network in which a transmitted first signal and a second signal are processed by a subscriber terminal upon receipt of the first signal to enable descrambling of a received scrambled signal upon it being determined by such processing that the first and second signals bear a predetermined relationship to one other and in which remote descrambling of the scrambled signal is controlled through the use of a given key signal that is used in a central station from which the scrambled signal is transmitted to encrypt another key signal that is transmitted to the subscriber terminal as an encrypted key signal and decrypted in the subscriber terminal by use of the given key signal to enable the scramble signal to be descrambled a system for preventing a subscriber from being able to enable descrambling of the scrambled signal through such deceit as substituting another signal for said transmitted first signal in order to obtain said predetermined relationship, wherein the system comprises means in the central station for encoding said given key signal prior to using said given key signal to encrypt said other key signal by processing said given key signal with said first signal; and means in each subscriber terminal for encoding said given key signal prior to use thereof for decrypting said encrypted key signal by processing said given key signal with said first signal.

6. In a subscriber communication network in which a transmitted first signal and a second signal are processed by a subscriber terminal upon receipt of the first signal to enable descrambling of a received scrambled signal upon it being determined by such processing that the first and second signals bear a predetermined relationship to one other, in which remote descrambling of the scrambled signal is controlled through the use of a given key signal that is encrypted in a central station from which the scrambled signal is transmitted, and in which said encrypted given key signal is transmitted to the subscriber terminal and decrypted in the subscriber terminal to enable the scrambled signal to be descrambled.

a system for preventing a subscriber from being able to enable descrambling of the scrambled signal through such deceit as substituting another signal for said transmitted first signal in order to obtain said predetermined relationship, wherein the system comprises means in the central station for encoding said given key signal prior to encrypting said given key signal for transmission by processing said given key signal with said first signal; and means in each subscriber terminal for decoding said given key signal following decryption thereof by processing said given key signal with said first signal.

* * * * *